(12) United States Patent
Lodhie et al.

(10) Patent No.: US 7,040,790 B2
(45) Date of Patent: May 9, 2006

(54) TWO CIRCUIT LED LIGHT BULB

(75) Inventors: Pervaiz Lodhie, Rolling Hills, CA (US); Steven R. Becerra, San Pedro, CA (US)

(73) Assignee: Ledtronics, Inc., Torrance, CA (US)

( * ) Notice: Subject to any disclaimer, the term of this patent is extended or adjusted under 35 U.S.C. 154(b) by 184 days.

(21) Appl. No.: 10/854,570

(22) Filed: May 25, 2004

(65) Prior Publication Data

US 2005/0265039 A1    Dec. 1, 2005

(51) Int. Cl.
*B60Q 1/56* (2006.01)
*F21V 21/00* (2006.01)

(52) U.S. Cl. ............... 362/541; 362/499; 362/545; 362/249; 362/800

(58) Field of Classification Search ........ 362/540–545, 362/499, 479, 509, 227, 230, 231, 235, 240, 362/249–252, 800
See application file for complete search history.

(56) References Cited

U.S. PATENT DOCUMENTS

| | | | | |
|---|---|---|---|---|
| 4,868,719 A | * | 9/1989 | Kouchi et al. | 362/545 |
| 5,224,773 A | * | 7/1993 | Arimura | 362/227 |
| 5,241,457 A | * | 8/1993 | Sasajima et al. | 362/503 |
| 5,577,832 A | * | 11/1996 | Lodhie | 362/249 |
| 5,765,940 A | * | 6/1998 | Levy et al. | 362/240 |
| 6,220,722 B1 | * | 4/2001 | Begemann | 362/231 |
| 6,598,996 B1 | * | 7/2003 | Lodhie | 362/545 |
| 6,700,502 B1 | * | 3/2004 | Pederson | 340/815.45 |
| 6,722,771 B1 | * | 4/2004 | Stephens | 362/231 |
| 6,814,459 B1 | * | 11/2004 | Pederson | 362/540 |

* cited by examiner

*Primary Examiner*—Ali Alavi
*Assistant Examiner*—Bao Q. Truong
(74) *Attorney, Agent, or Firm*—Irving Keschner

(57) ABSTRACT

An improved LED light bulb for use in a brake light bulb socket of an automobile or similar vehicle wherein selected numbers of LED are energized at full intensity depending upon whether the automobile is in the brake light mode or the tail light mode. The light emitting diode lamp includes first and second printed circuit boards having first and second pluralities of light emitting diodes mounted thereupon for emitting monochromatic light in response to power signals supplied from the automobile. All LED's are on full intensity in the brake light mode and less than the full number of LED's on the first and second printed circuit boards are on at full intensity for the tail light mode.

6 Claims, 5 Drawing Sheets

TWO CIRCUIT LED LIGHT BULB

BACKGROUND OF THE INVENTION

1. Field of the Invention

The present invention provides a two circuit brake, tail and turn signal light emitting diode lamp.

2. Description of the Prior Art

Light emitting diode lamps have been used to replace incandescent lamps used in automobiles and other motor vehicles and to replace LED lamps for both single filament and dual filament incandescent bulbs. LED's typically operate at voltages between 1.7 and 2.2 volts.

A typical prior art incandescent lamp generally employs a type S-8 glass bulb cemented in a brass bayonet base having dual contacts. A similar incandescent lamp is described in Devir et al., U.S. Pat. No. 4,603,278. Incandescent vehicle signal-lamps consume a relatively large amount of power, generate a large amount of heat and have a relatively short life.

LED lamps designed to replace vehicle incandescent lamps require bases similar to the standard bayonet base. To be effective an LED lamp must be adapted to produce an intense light when viewed by the human eye and must provide for effective heat dissipation to avoid impairing the LED's. It also must be designed to operate within the range of voltages present in motor vehicles so as to not overvoltage the LED's. Finally, some models of motor vehicles ground the brake circuit when the brake is not activated to prevent any accidental activation of the brake lights; accordingly, an effective LED lamp designed to replace a dual filament lamp must contain circuitry enabling the LED's to be activated with either the tail lamp circuit or the brake light circuit.

U.S. Pat. No. 6,371,636 to Wesson teaches a light emitting diode lamp for use in vehicle tail, brake or turn signal lamp fixtures for integrated single and dual element operation. The module has integrated dual element control circuitry, voltage and current control circuitry, brightness enhancement circuitry, and LED circuitry built into the universal body. All the LED's are energized if either the tail lamp or brake lamp circuits were energized.

U.S. Pat. No. 6,598,996 to Lodhie provides a light emitting diode lamp for use in a brake light bulb socket of an automobile or similar vehicle. The light emitting diode lamp can be used as both a brake signal and a turn signal. The light emitting diode lamp includes first and second printed circuit boards having first and second pluralities of light emitting diodes mounted thereupon for emitting monochromatic light in response to power signals supplied from the automobile. The light emitting diode lamp further includes a body adapted to form a bayonet connection, a base having at least one contact, and a support sleeve having a wiring conduit, a support tray, and at least two support stanchions for supporting the first printed circuit board. The light emitting diode lamp also includes an electrical control means electrically connecting the first and second contacts with the first and second printed circuit boards, and a lens cap having a planar front face integrally formed with a cylindrical lens sidewall that terminates in a lens perimeter. The support sleeve supports first and second printed circuit boards in an operable relationship for maximum output of monochromatic light while maintaining high impact resistance. All the LED's are on full intensity in the brake light mode and, via a contact switch in the base, all LED's are on at low intensity for the tail light mode using a single or a plurality of resistors.

Although the diode lamp disclosed in Lodhie performs extremely well, it would be desired if the lamp can be operated in a manner where selected lamps in both modes are operated in full intensity thus avoiding the use of resistors to dim or reduce the intensity of the LED's.

What is desired is to provide a LED bulb having a bayonet base and wherein different groups of LED's are energized depending upon whether the car is in the tail light or brake light mode.

SUMMARY OF THE INVENTION

The present invention provides an improved LED light bulb for use in brake light bulb socket of an automobile or similar vehicle wherein selected numbers of LED are energized at full intensity depending upon whether the automobile is in the brake light mode on the tail light mode. The light emitting diode lamp includes first and second printed circuit boards having first and second pluralities of light emitting diodes mounted thereupon for emitting monochromatic light in response to power signals supplied from the automobile. The light emitting diode lamp further includes a body adapted to form a bayonet connection, a base having at least one contact, and a support sleeve having a wiring conduit, a support tray, and at least two support stanchions for supporting the first printed circuit board. The light emitting diode lamp also includes an electrical control means electrically connecting the first and second contacts with the first and second printed circuit boards, and a lens cap having a planar front face integrally formed with a cylindrical lens sidewall that terminates in a lens perimeter. The support sleeve supports first and second printed circuit boards in an operable relationship for maximum output of monochromatic light while maintaining high impact resistance. All the LED's are on full intensity in the brake light mode and, via a contact switch in the base, less than the full number of LED's on the first and second printed circuit boards are on at full intensity in the tail light mode, resistors not being required to dim or reduce the intensity of the energized LED's.

The present invention thus provides an improved vehicle LED light bulb having brake light and tail light modes wherein the manufacturing cost thereof is lowered due to the reduced number of components required to perform those functions.

DESCRIPTION OF THE DRAWINGS

For a better understanding of the present invention as well as other objects and further features thereof, reference is made to the following description which is to be read in conjunction with the accompanying drawing therein.

DESCRIPTION OF THE INVENTION

The present invention provides a light emitting diode lamp 10 for use in a brake light bulb socket (not shown) of an automobile or similar vehicle. In the preferred embodiment, the light emitting diode lamp 10 can be used as both a brake signal and a turn signal.

Figure 1:
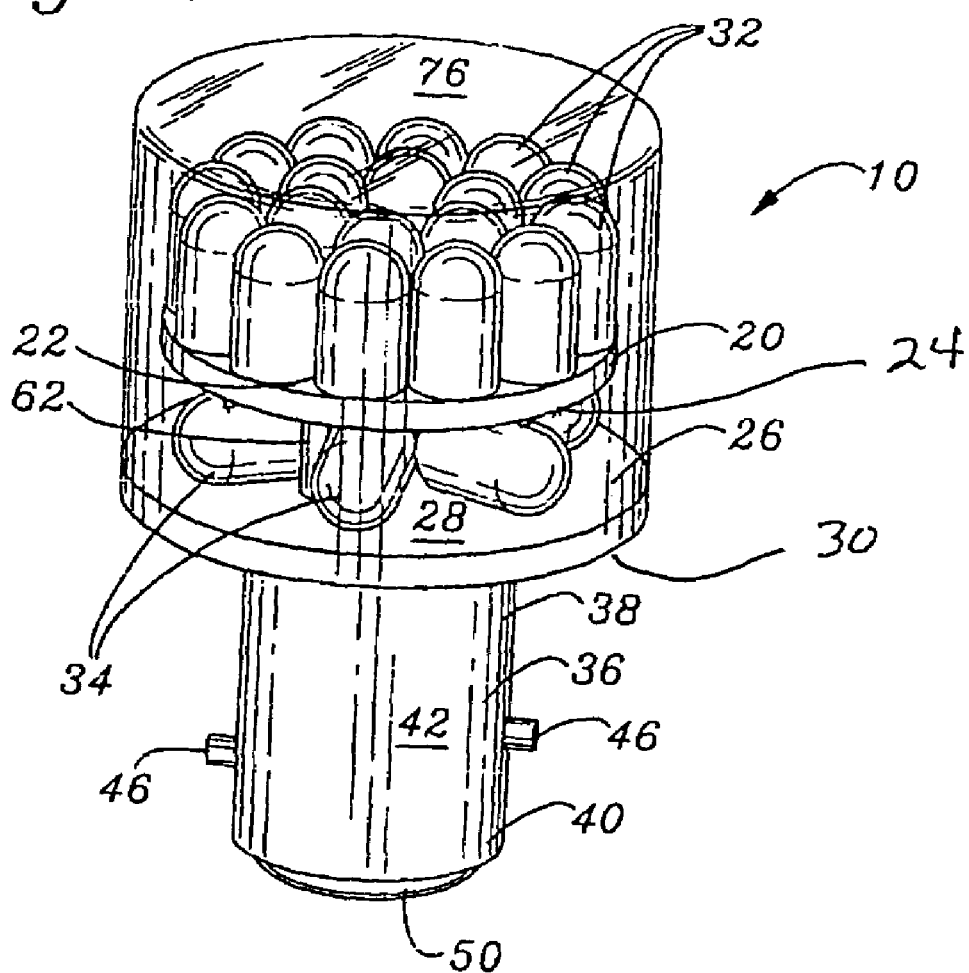
FIG. 1 is a perspective view of the LED bulb of the present invention.

As shown in FIG. 1, the light emitting diode lamp 10 includes first and second printed circuit boards 20 and 26 having first and second pluralities of light emitting diodes 32 and 34 mounted thereupon for emitting monochromatic light in response to power signals supplied from the automobile. The first printed circuit board 20 has a top surface 22 and a bottom surface 24. The second printed circuit board 26 has a top surface 28 and a bottom surface 30. The first plurality of light emitting diodes 32 is mounted on and generally normal to top surface 22 and electrically coupled with printed circuit board 20. The second plurality of light emitting diodes 34 is mounted on and generally parallel to top surface 28 and electrically coupled with printed circuit board 26.

Light emitting diode lamp 10 includes a body 36 having a first end 38, a second end 40, and a body sidewall 42 defining a cavity within the body 36 (body 36 is actually a cross section of sidewall 42). The body sidewall 42 has two alignment pins 46 extending therefrom to form a bayonet connection that is typically used for forming an operable connection with a brake light bulb socket. The body 36 is preferably constructed of an electrically conductive material for providing a ground.

Figure 2:
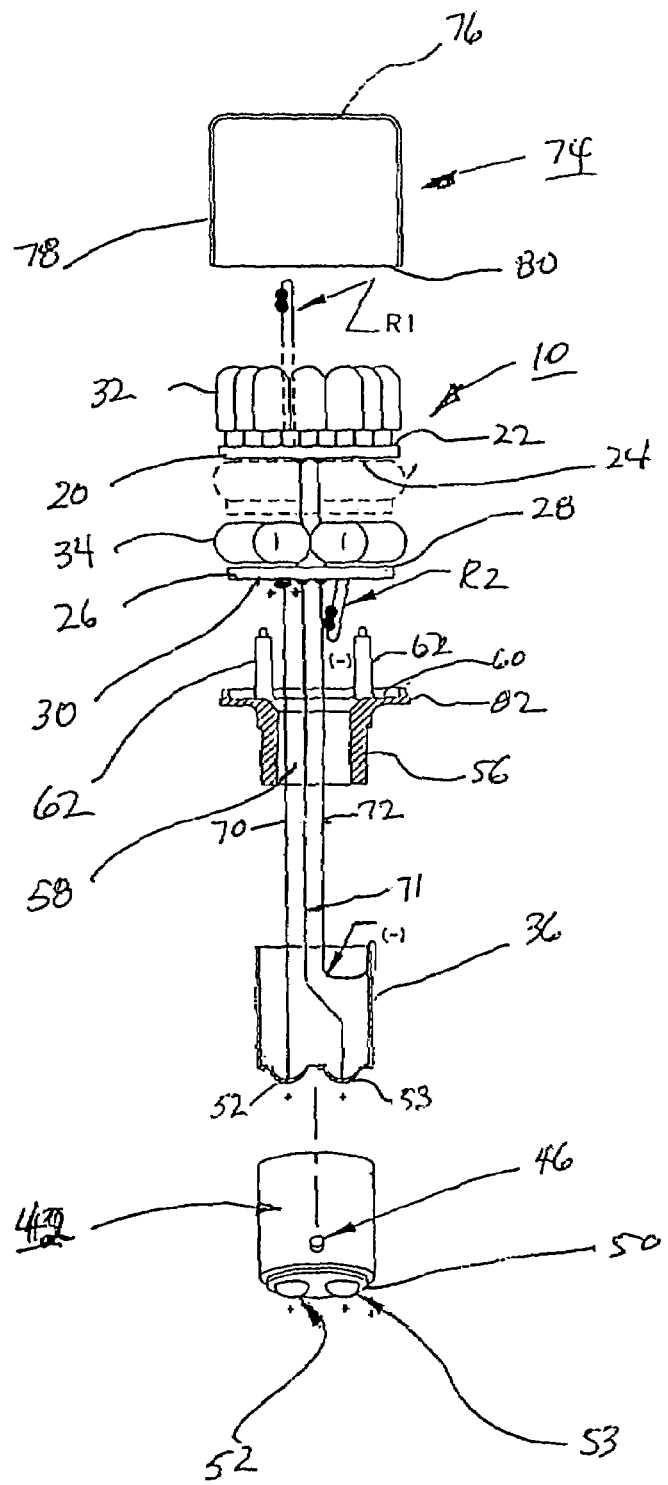
FIG. 2 is an exploded perspective view thereof.

As shown in FIG. 2, the light emitting diode lamp 10 includes a base 50 having contacts 52. The base 50 is operably attached to the second end 40 of the body 36. Contacts 52 and 53 (tail and brake, respectively) are electrically isolated, except for the ground, for providing power to the light emitting diode lamp 10.

As shown in FIG. 2, the light emitting diode lamp 10 includes a support sleeve 56 that has a wiring conduit 58, a support tray 60, and support stanchions 62. The support tray 60 is shaped like a planar tray to support printed circuit board 26 thereupon. The support stanchions 62 extending upwardly from the support tray 60 to support printed circuit board 20 above and generally parallel to printed circuit board 26. Although FIG. 2 illustrates two support stanchions 62, the number can vary as long as printed circuit board 20 is firmly supported. The support sleeve 56 is constructed of a tough, impact and heat resistant material such as plastic. Leads 70 and 71 are coupled to contacts 52 and 53, respectively, and ground wire lead 72 is connected to the base 36/42 and to the negative output shown in the schematic diagram shown in FIG. 3.

The light emitting diode lamp 10 includes a lens cap 74 having a planar front face 76 integrally formed with a cylindrical lens sidewall 78 that terminates in a lens perimeter 80. The support tray 60 preferably has a tray perimeter 82 adapted to engage the lens perimeter 80 for providing a secure connection between the two elements.

Figure 3:
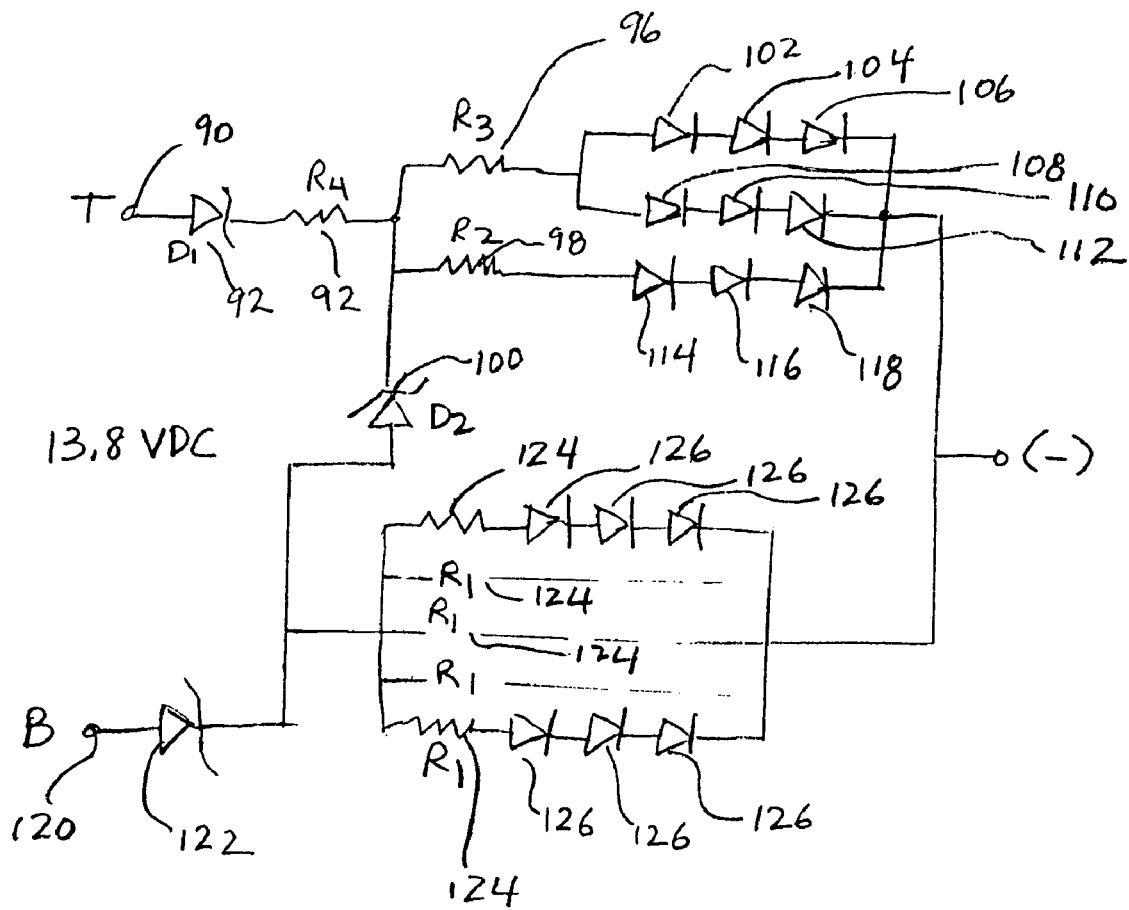
FIG. 3 is a schematic diagram of the circuitry used in the bulb brake light and tail light modes.

Referring now to FIG. 3, a schematic diagram of the control circuitry used in the automobile brake light and tail light modes is illustrated. In the tail light mode, a voltage signal applied to terminal 90 causes current to flow through diode 92, resistor 94 and resistors 96 and 98. The polarity of diode 100 is such that current is prevented from flowing therethrough. LED's 102 through 112, mounted on circuit board 26, a total of six LED's are energized in a manner such that they emit full intensity illumination. In addition, LED's 114, 116 and 118, mounted on circuit board 20, are also energized in the tail light mode (see FIG. 4A), a total of nine LED's thus being energized in this mode.

In the brake light mode, a voltage signal is applied to terminal 120 causing current to flow through diode 122 and resistors 124 connected in a parallel arrangement of five branches as illustrated. Current flowing through these parallel paths to fully energize the three LED's 126 in each parallel branch (a total of fifteen LED's). These LED's are also mounted on printed circuit board 20. At the same time, LED's 102 through 118 are fully energized. The result is that in the tail light mode, all six LED's on printed circuit board 26 are energized and three of the fifteen LED's on printed circuit board 20 are energized. In the brake light mode, all twenty four LED's are fully energized. The negative output shown in the figure is coupled to the negative lead shown in FIG. 2.

It should be noted that in automotive electrical systems, diode 122 is used as a blocking diode to prevent a reverse flow of voltage when terminal (contact) 90 is energized. When terminal (contact) 120 is energized, diode 92 acts as a blocking diode to prevent a reverse flow of voltage.

The resistors shown in FIG. 3 are used in a conventional manner, i.e. to enable the LED's to operate properly without overheating by reducing the circuit voltage. In accordance with the teachings of the present invention, resistors are not used to shunt or dim the LED's when in the tail light or brake light modes, all the LED's operating at full intensity.

Figure 4A:
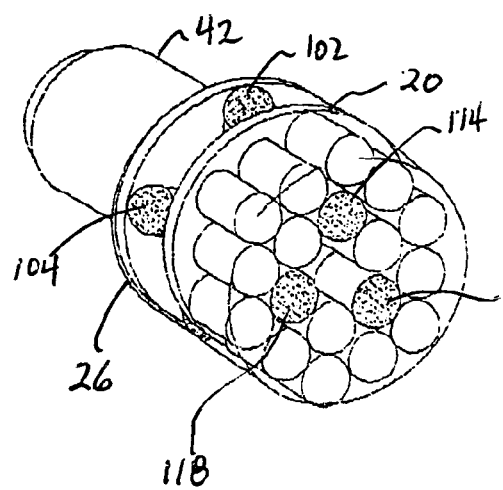
FIGS. 4A and 4B illustrate LED's energized in the tail light and brake light modes, respectively.
Figure 4B:
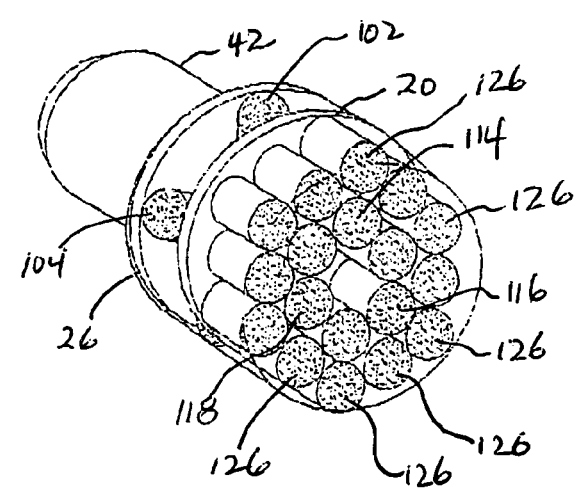

FIG. 4A illustrates the light bulb of the present invention in the tail light mode with three LED's 114, 116 and 118 in the front and six LED's 102, 104 . . . 112 in the back illuminated; FIG. 4B illustrates the brake light mode with all twenty-four LED's illuminated.

Figure 5:
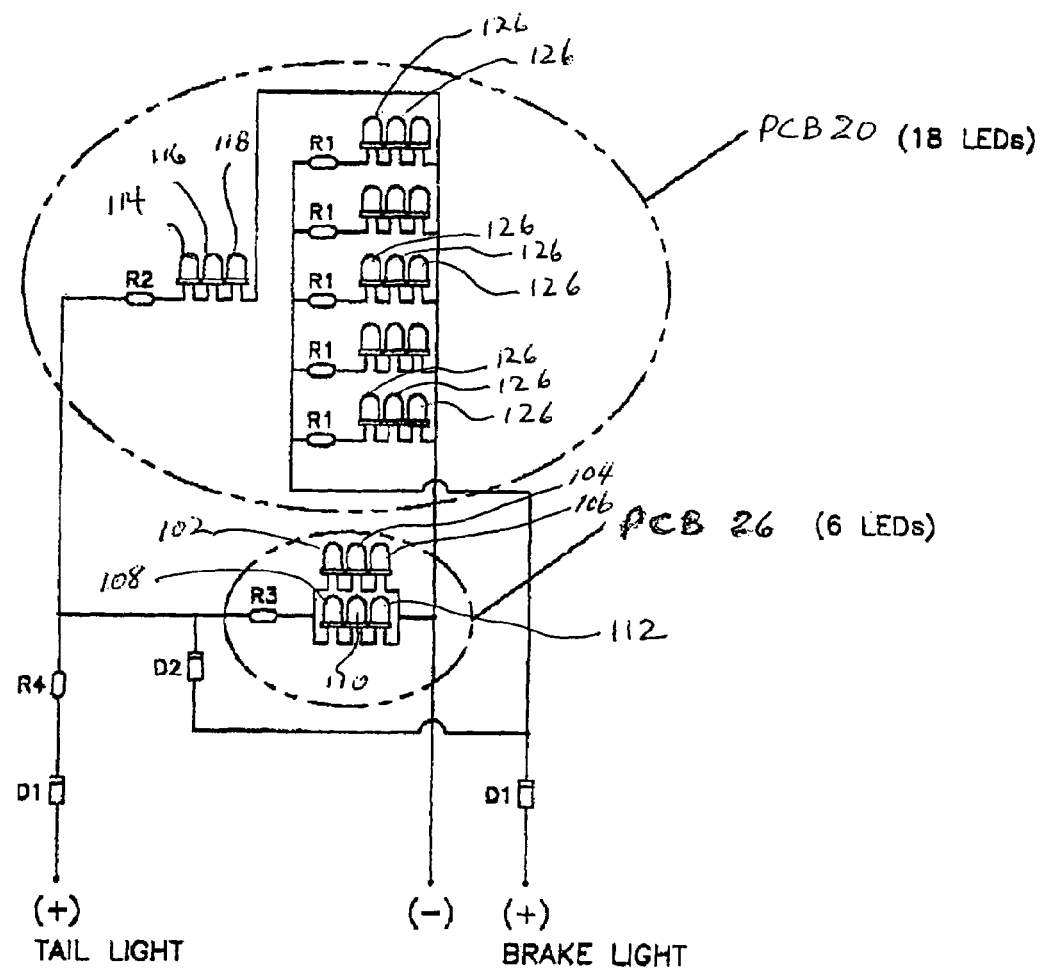
FIG. 5 is another illustration of the wiring/schematic diagram of the circuitry utilized in the present invention.

FIG. 5 is another schematic/wiring diagram illustrating the LED connections such that in the tail light mode the three LED's from PCB 20 and all six LED's from PCB 26 are energized; in the brake light mode, all twenty-four LED's from PCB's 20 and 26 are energized.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. A light emitting diode lamp for use in vehicle, said vehicle having a brake light and tail light modes comprising:
    a first printed circuit board having a first top surface and a first bottom surface;
    a second printed circuit board having a second top surface and a second bottom surface;
    a first plurality of light emitting diodes mounted on and generally normal to the first top surface and electrically coupled with the first printed circuit board;
    a second plurality of light emitting diodes mounted on and generally parallel to the second top surface and electrically coupled with the second printed circuit board;
    a body having a first end, a second end, and a body sidewall defining a cavity within the body, the body sidewall having two alignment pins extending therefrom;
    a base having a plurality of contacts, the base being attached to the second end of the body; and
    an electrical control means electrically connecting said contacts with the first and second printed circuit boards, said electrical control means causing all of said first and second plurality of light emitting diodes to be fully energized when said vehicle is in said brake light mode and causing selected ones of said first plurality of light emitting diodes and all of said second plurality of light emitting diodes to be fully energized when said vehicle is in said tail light mode.

2. The lamp of claim 1 wherein less than one-half of said first plurality of light emitting diodes are energized when said vehicle is in said tail light mode.

3. The lamp of claim 1 further including a support sleeve having a wiring conduit, a support tray for supporting said second printed circuit board and support stanchions, said support stanchions extending upwardly from the support tray to support said first printed circuit board above and generally parallel to said second printed circuit board.

4. The lamp of claim 1 wherein eighteen light emitting diodes are mounted on said first printed circuit board and six light emitting diodes are mounted on said second printed circuit board.

5. The lamp of claim 4 wherein three light emitting diodes mounted on said first printed circuit board and all six light emitting diodes on said second printed circuit board are energized in said tail light mode.

6. The lamp of claim 4 wherein all twenty four light emitting diodes are energized in said brake light mode.

* * * * *